(12) United States Patent
Aimone et al.

(10) Patent No.: US 11,880,448 B1
(45) Date of Patent: Jan. 23, 2024

(54) SECURE AUTHENTICATION USING RECURRENT NEURAL NETWORKS

(71) Applicant: National Technology & Engineering Solutions of Sandia, LLC, Albuquerque, NM (US)

(72) Inventors: James Bradley Aimone, Keller, TX (US); Jason Hamlet, Albuquerque, NM (US); Tu-Thach Quach, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 267 days.

(21) Appl. No.: 17/196,295

(22) Filed: Mar. 9, 2021

(51) Int. Cl.
| | |
|---|---|
| *H04L 29/06* | (2006.01) |
| *G06F 21/45* | (2013.01) |
| *H04L 9/40* | (2022.01) |
| *H04L 9/32* | (2006.01) |
| *G06N 3/08* | (2023.01) |
| *G06N 3/044* | (2023.01) |
| *G06N 3/045* | (2023.01) |

(52) U.S. Cl.
CPC ............. *G06F 21/45* (2013.01); *G06N 3/044* (2023.01); *G06N 3/045* (2023.01); *G06N 3/08* (2013.01); *H04L 9/3278* (2013.01); *H04L 63/08* (2013.01); *H04L 2463/082* (2013.01)

(58) Field of Classification Search
CPC ........ G06F 21/45; G06N 3/045; G06N 3/044; G06N 3/08; H04L 9/3278; H04L 63/08; H04L 2463/082; H04L 9/32
See application file for complete search history.

(56) References Cited

U.S. PATENT DOCUMENTS

| | | | |
|---|---|---|---|
| 2018/0189645 A1* | 7/2018 | Chen | G06N 3/049 |
| 2019/0228285 A1* | 7/2019 | Zhang | G06N 3/04 |
| 2019/0260742 A1* | 8/2019 | Arora | G06N 3/08 |

(Continued)

OTHER PUBLICATIONS

Jin Y. et al., "SSO-LSM: A Sparse and Self-Organizing Architecture for Liquid State Machine based Neural Processors", 2016 IEEE/ACM International Symposium on Nanoscale Architectures (NANOARCH), Jul. 18-20, 2016, Beijing, China. IEEE Explore, 2016 pp. 55-60 (Year: 2016).*

(Continued)

*Primary Examiner* — Evans Desrosiers
(74) *Attorney, Agent, or Firm* — Gregory M. Doudnikoff; Yee & Associates, P.C.

(57) ABSTRACT

A computer-implemented method of user authentication is provided. The method comprises combining, by a computer system, a user recurrent neural network with a system recurrent neural network to form a unique combined recurrent neural network. The user recurrent neural network is configured to generate a unique user key, and the system recurrent neural network is configured to generate a system key. The computer system inputs a predetermined input into the combined recurrent neural network, and the combined recurrent neural network generates a unique combined key from the input, wherein the combined key differs from both the user key and system key. The computer system then associates the combined key with a unique access authorization to authenticate a user.

21 Claims, 9 Drawing Sheets

(56) References Cited

U.S. PATENT DOCUMENTS

2022/0108225 A1* 4/2022 Gidney .................. G06N 5/04

OTHER PUBLICATIONS

Shah N. et al., 2019. "A 0.16pJ/bit Recurrent Neural Network Based PUF for Enhanced Machine Learning Attack Resistance", In 24th Asia and South Pacific Design Automation Conference (ASPDAC '19), Jan. 21-24, 2019, Tokyo, Japan. ACM, New York, NY, USA, Article 4, 6 pages (Year: 2019).*

* cited by examiner

SECURE AUTHENTICATION USING RECURRENT NEURAL NETWORKS

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND

1. Field

The disclosure relates generally to computer networks, and more specifically to authenticating users using unique combined keys generated by chaotic neural networks.

2. Description of the Related Art

Secure authentication is a critical aspect of any cyber system. Blocking inappropriate access to critical systems is a first line defense for any security strategy yet is also often a primary target for adversarial technology development. For legitimate users, an inefficient or unreliable authentication system is a considerable drain on productivity as well as a potential security risk itself, as users will often seek ways to circumvent hassles of an inefficient process. It is critical to develop potential strategies for secure user authentication that are not only robust and reliable for legitimate users but also costly and challenging to adversaries.

A common approach to limit access is to have some level of hardware authentication in addition to conventional password-based authentication. Many of these methods are digital in nature, which is clearly cost effective and simple to implement. However, with this simplicity comes other costs, such as the vulnerability of passwords, keys, and tokens to adversaries.

Therefore, it would be desirable to have a method and apparatus that take into account at least some of the issues discussed above, as well as other possible issues.

SUMMARY

An illustrative embodiment provides a computer-implemented method of user authentication. The method comprises combining, by a computer system, a user recurrent neural network with a system recurrent neural network to form a unique combined recurrent neural network. The user recurrent neural network is configured to generate a unique user key, and the system recurrent neural network is configured to generate a system key. The computer system inputs a predetermined input into the combined recurrent neural network, and the combined recurrent neural network generates a unique combined key from the input, wherein the combined key differs from both the user key and system key. The computer system then associates the combined key with a unique access authorization to authenticate a user.

Another illustrative embodiment provides a computer-implemented method of user authentication. The method comprises combining, by a computer system, each of a number of user recurrent neural network with a system recurrent neural network to form respective unique combined recurrent neural networks. Each user recurrent neural network generates a unique respective user key, and the system recurrent neural network generates a system key. The computer system inputs a same predetermined input into each combined recurrent neural network, wherein each combined neural circuit generates a unique combined key from the same input. Each combined key differs from the system key and the user key of the user recurrent neural network comprising each combined recurrent neural network. The computer system then associates each combined key with a unique access authorization to authenticate a user.

Another illustrative embodiment provides a user authentication system. The system comprises a user recurrent neural network configured to generate a user key and a computer system. The computer system comprises a system recurrent neural network configured to generate a system key and a storage device configured to store program instructions and one or more processors operably connected to the storage device and configured to execute the program instructions to cause the computer system to: combine the user recurrent neural network with the system recurrent neural network to form a unique combined recurrent neural network; input a predetermined input into the combined recurrent neural network; generate, with the combined recurrent neural network, a unique combined key from the input, wherein the combined key differs from both the user key and system key; and associate the combined key with a unique access authorization to authenticate a user.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
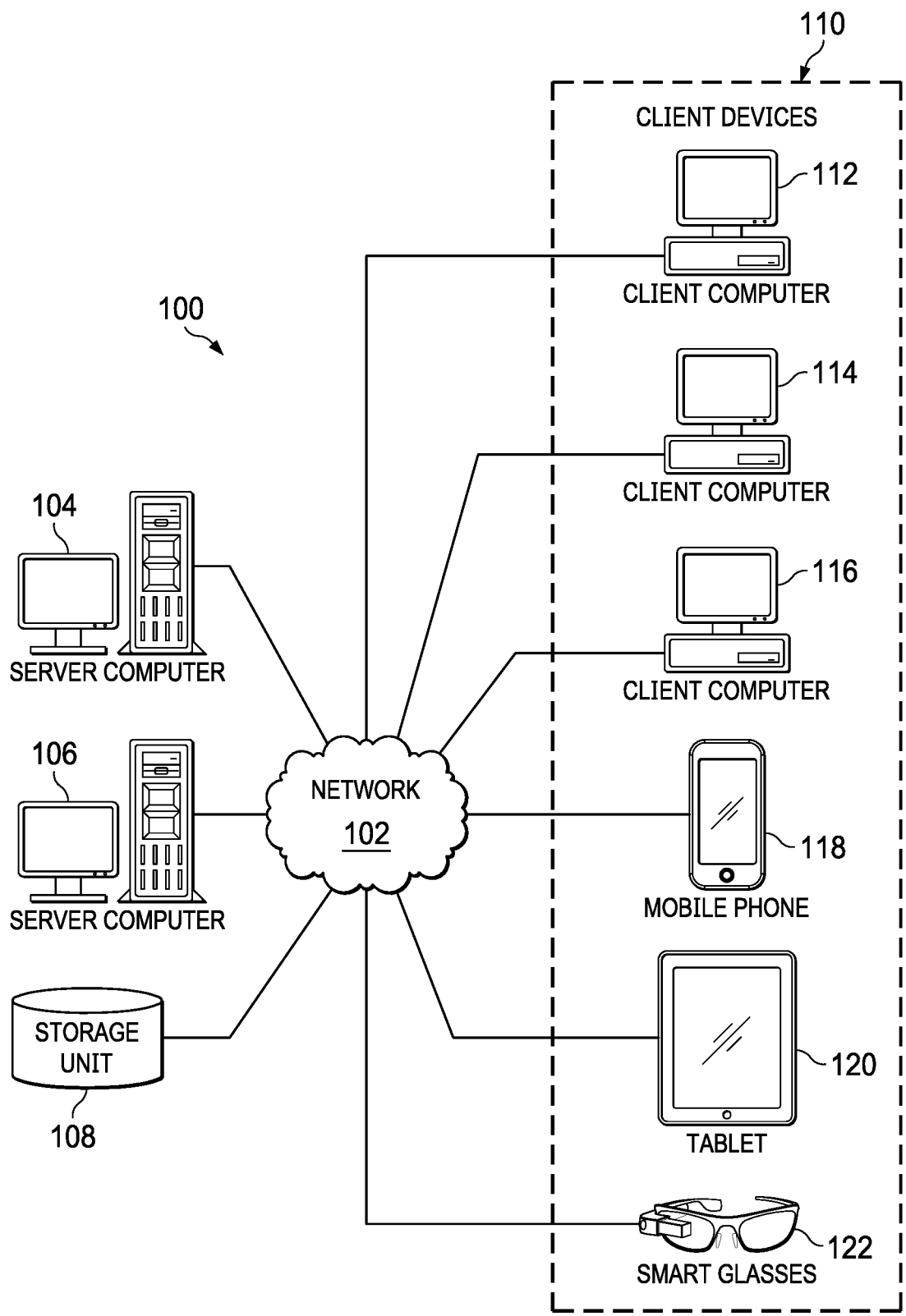
FIG. 1 is a pictorial representation of a network of data processing systems in which illustrative embodiments may be implemented.

The illustrative embodiments recognize and take into account one or more different considerations. For example, the illustrative embodiments recognize and take into account that blocking inappropriate access to critical systems is a first line defense for any security strategy yet is also often a primary target for adversarial technology development. The illustrating embodiments also recognize and take into account that it is critical to develop potential strategies for secure user authentication that are not only robust and reliable for legitimate users but also costly and challenging to adversaries.

The illustrative embodiments also recognize and take into account that common approaches to limit access that are digital in nature, which are cost effective and simple to implement but suffer vulnerability of passwords, keys, and tokens by adversaries.

The illustrative embodiments also recognize and take into account that the neural architecture of the brain is one of the most complex computational structures known, and a system inspired by biological neural circuits may confer unique properties for security.

The illustrative embodiments also recognize and take into account that research on artificial neural network (ANN) has focused primarily on large networks of generally feed-forward perceptrons or similarly-structured nodes. The illustrating embodiments also recognize and take into account that recurrent neural networks (RNNs) such chaotic neural circuits (CNC) and liquid state machines (LSMs), comprise large populations of sparsely connected neurons which communicate using spikes, which are the event-based representations used by biological neurons to communicate information at a discrete time if and only if a threshold is surpassed. Unlike standard ANNs, RNNs like CNCs and LSMs produce complex temporally dynamic behavior that offers several unique properties.

CNCs are typically deterministic in their implementation yet highly sensitive to inputs and configuration. As a result, a similar but slightly different network may produce very different behaviors. Furthermore, the spike-based dynamics of CNCs mean that the relevant state of the system is always distributed and transient. Therefore, partial snapshots of the circuit at a given time is typically insufficient to understand the full system. Additionally, there are well-understood CNC algorithms that are relatively simple to implement.

The illustrative embodiments provide an authentication system comprising coupled RNNs which form combined networks that are dynamically distinct from the original networks. Users each have a key implemented in a hardware device. When each key is combined with a key belonging to the system being accessed, the combination results in a unique circuit that produces data transformations that are unique from any isolated key or other combination key. A combination key yields neuron activity that would be otherwise unlikely (or impossible) to observe, resulting in a neural computational physically unclonable function (PUF) that offers increased security and more flexible utility than conventional electronic PUFs.

A security system utilizes this property by probing the combined circuit with a test input, i.e., a pre-determined sequence of spikes to neurons on the host side of the circuit, and internally comparing the combined circuit's measured activity to a stored pattern. If the combined circuit answers with the appropriate response, access can be confidently granted. This response will be different for every possible circuit pairing, allowing individualized access.

The illustrative embodiments provide a number of advantages over other authentication systems. Authentication is individualized at both a system and user level. A compromised system key or user key would not reveal information about the other keys or the system key, allowing the uncompromised keys to be used confidently for access to other systems. Authentication can be one-way or two-way. The system can either probe the combined network directly or it can rely on the user to provide a separate key. One-way authentication by the system would potentially obfuscate the user-key, protecting it from a compromised system; whereas two-way authentication could provide multi-factor authentication to protect from a compromised user-key.

The authentication system can be implemented in software. A hardware implementation might utilize a neuromorphic architecture, which is potentially optimal for both computing and security.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP)

suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
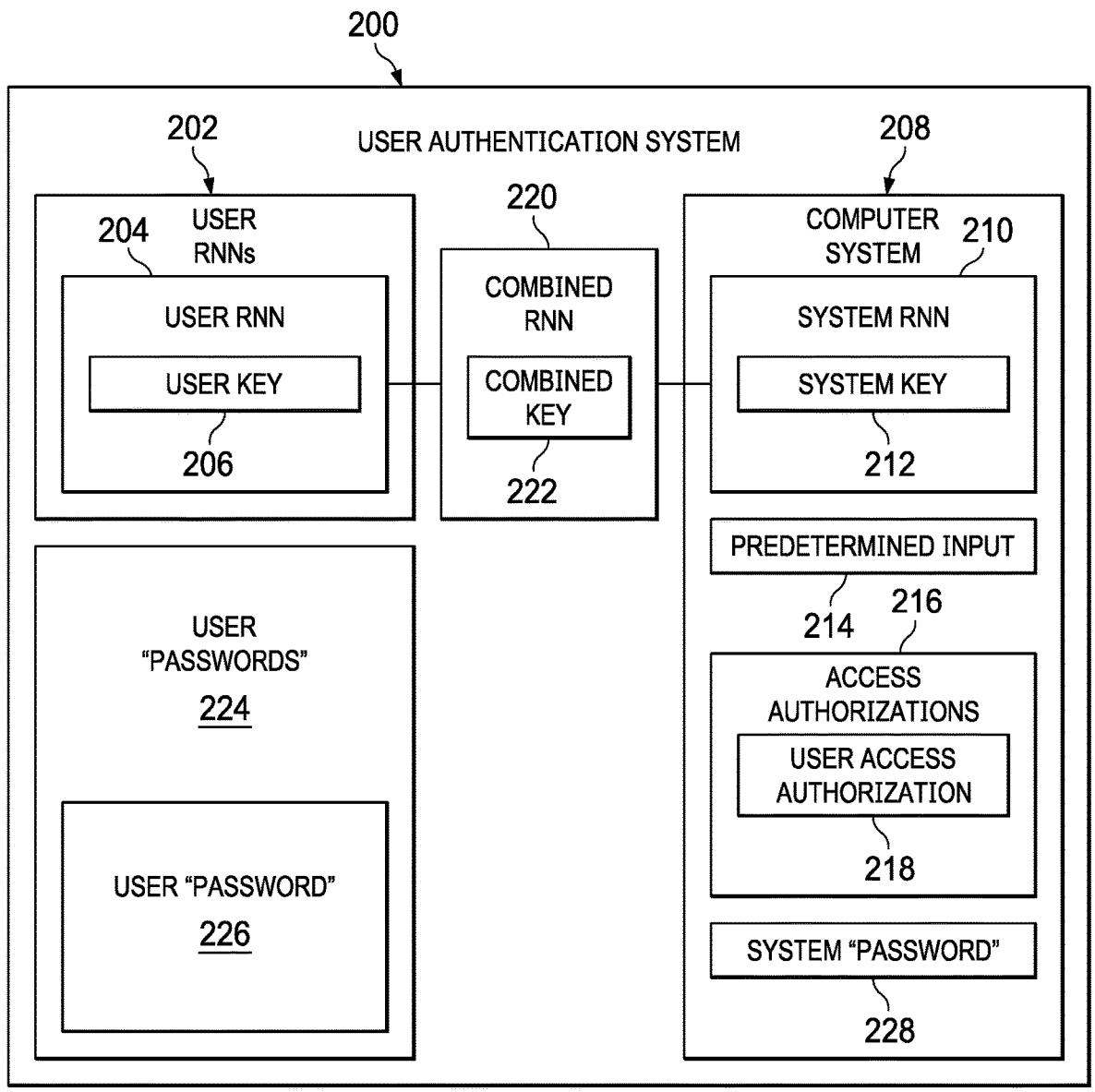
FIG. 2 depicts a block diagram of a user authentication system in accordance with an illustrative embodiment.

FIG. 2 depicts a block diagram of a user authentication system in accordance with an illustrative embodiment. User authentication system 200 may be implemented in network data processing system 100 in FIG. 1.

User authentication system 200 comprises computer system 208 that can be accesses by a number of users using respective user RNNs 202. Each user RNN 204 generates a unique user key 206. Similarly, computer system 208 comprises its own system RNN 210, which generates a unique system key 212. User RNNs 202 and system RNN 210 might comprise liquid state machines (LSM).

When a user attempts to access computer system 208, that user's unique user RNN 204 is combined with the system RNN 210 to create combined RNN 220. System RNN 210 is the same for all users, but the combination of each unique user RNN 204 with the system RNN 210 produces a unique combined RNN 220 that is different for each user. Furthermore, combined RNN 220 also exhibits different computational characteristics than either of the constituent user RNN 204 or system RNN 210. In other words, the dynamics of combined network evolves in a way that is not a simple linear combination of the constituent keys because of the non-linearities in the network.

Computer system 208 tests the authenticity of combined RNN 220 by providing it a predetermined input 214. Because of the uniqueness of each combination RNN 220, the combined key 222 generated by combined RNN 220 will differ for each user in response to the same predetermined input 214 provided by computer system 208. Computer system 208 compares this combined key 222 to a record of access authorizations 216 and matches combined key 222 to a user access authorization 218.

The keys 206, 212, 222 comprise the respective output of the individual or combined RNNs 206, 210, 222. Whereas a RNN is a physical instantiation, the key is the observed behavior/output. The combined key 222 generated by combined RNN 220 is distinction from user key 206 and system key 212 generated by the constituent RNNs 204, 210 and is not a linear extrapolation of those keys.

User authorization system 200 might also incorporate multi-factor authorization from either the user side or system side. For user side multi-factor authorization, users have unique user "passwords" 224 that can be provided to combined RNN 220 as a second predetermined input in addition to the input 214 provided by the system. Each user "password" 226 might comprise a conventional symbolic/alphanumeric password, passphrase, personal identification number (PIN), and/or a biometric input. Examples of biometric input include voice recognition, facial recognition, retinal scan, iris recognition, fingerprints, handprint, palm vein pattern, etc. Similarly, for system side verification, computer system 208 has a system "password" code that be input into combined RNN 220 as a second predetermined input after a user connection is authenticated and established.

User authentication system 200 can be implemented in software, hardware, firmware or a combination thereof. When software is used, the operations performed by user authentication system 200 can be implemented in program code configured to run on hardware, such as a processor unit. When firmware is used, the operations performed by user authentication system 200 can be implemented in program code and data and stored in persistent memory to run on a processor unit. When hardware is employed, the hardware might include circuits that operate to perform the operations in user authentication system 200. Specifically, the hardware might comprise neuromorphic hardware.

Figure 3:
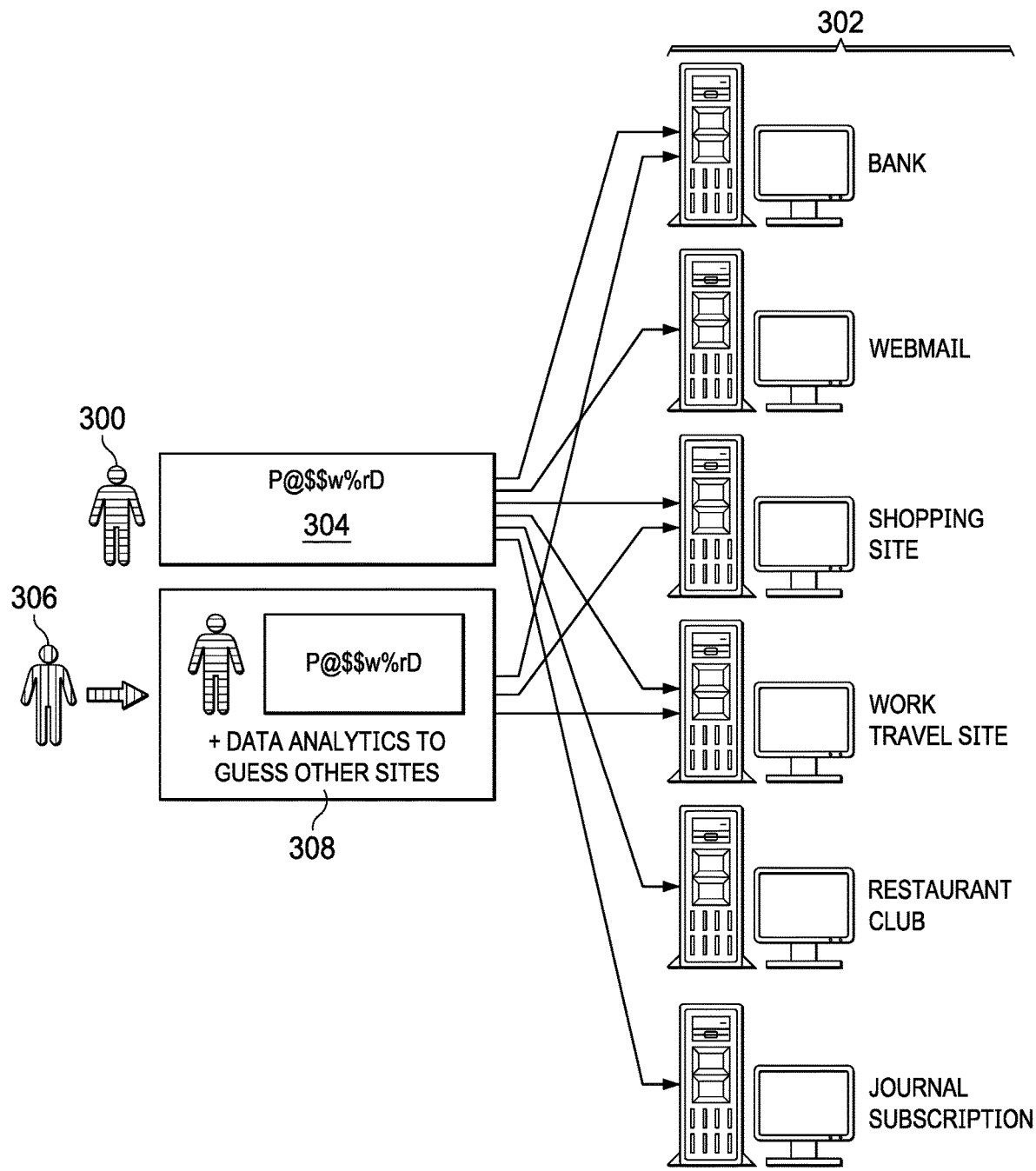
FIG. 3 illustrates vulnerabilities of typical user authorization in accordance with the prior art.

FIG. 3 depicts vulnerabilities of typical user authorization in accordance with the prior art. User 300 might access a number of computer system accounts 302 with password(s) 304. Examples of such accounts include banking, webmail, shopping websites, work travels sites, restaurant clubs, journal subscriptions, etc. The reliance on passwords 304 rests on the assumption that the respective systems 302 will keep the passwords safe.

Maintaining trust is cyber systems requires robust and reliable authentication technologies. Current authorization technologies employ a mix of software (e.g., passwords) and hardware (e.g., Homeland Security Presidential Directive (HSPD) credentials). However, current authentication techniques often risk exposing credentials or tokens to adversaries 306. Once a password or token is compromised an adversary 306 can use data analytics 308 to predict access to more secure sites.

Figure 4:
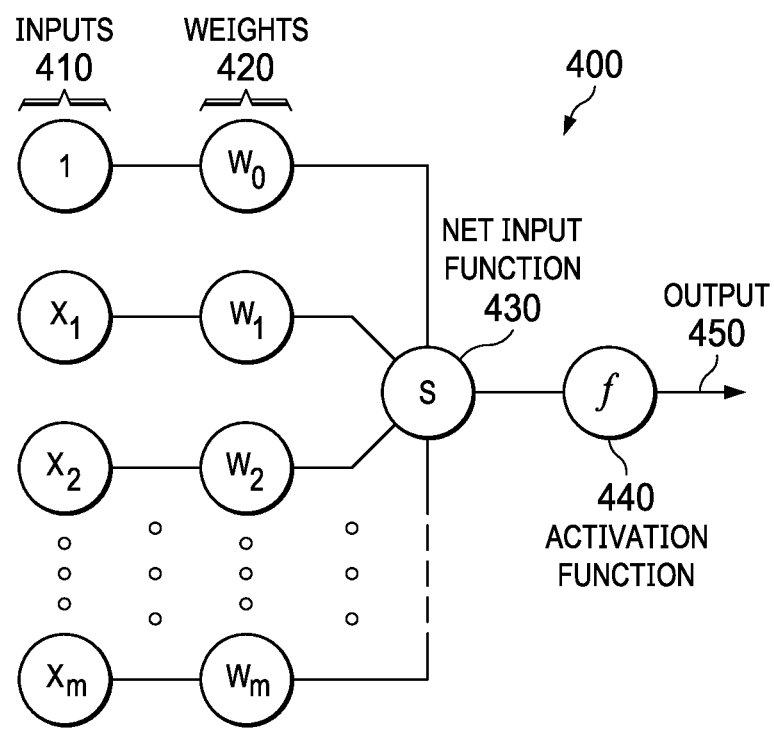
FIG. 4 depicts a diagram illustrating a node in a neural network with which illustrative embodiments can be implemented.

FIG. 4 depicts a diagram illustrating a node in a neural network with which illustrative embodiments can be implemented. Node 400 combines multiple inputs 410 from other nodes. Each input 410 is multiplied by a respective weight 420 that either amplifies or dampens that input, thereby assigning significance to each input for the task the algorithm is trying to learn. The weighted inputs are collected by a net input function 430 and then passed through an activation function 440 to determine the output 450. The connections between nodes are called edges. The respective weights of nodes and edges might change as learning proceeds, increasing, or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input. Neural network layers can be stacked to create deep networks.

A recurrent neural network (RNN) is a type of deep neural network in which the nodes are formed along a temporal sequence. RNNs exhibit temporal dynamic behavior, meaning they model behavior that varies over time. Whereas traditional neural networks process inputs independently, starting from scratch with each new input, RNNs persistence information from a previous input that informs processing of the next input in a sequence. There are several variants of RNNs such as "vanilla" RNNs, Long Short-Term Memory (LSTM), Gated Recurrent Unit (GRU), chaotic neural circuits (CNC), and liquid state machines (LSM) with which the illustrative embodiments can be implemented.

Figure 5:
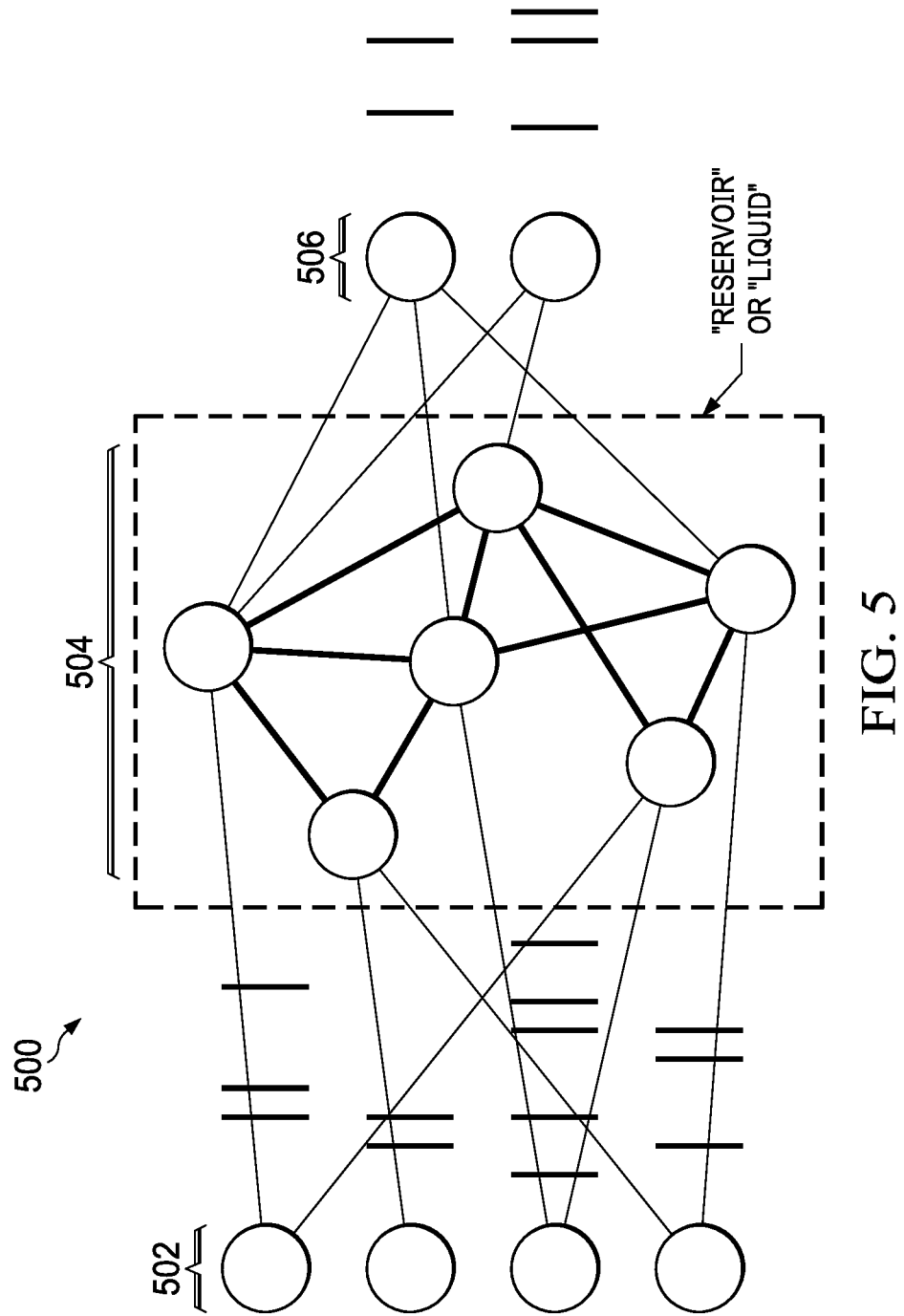
FIG. 5 depicts a diagram illustrating a chaotic neural circuit in which illustrative embodiments can be implemented.

FIG. 5 is a diagram illustrating a chaotic neural circuit (CNC) in which illustrative embodiments can be implemented. As shown in FIG. 5, the nodes in CNC 500 are divided into a layer of visible nodes 502, a layer of hidden nodes 504, and a layer of outputs nodes 506. The nodes in these layers might comprise nodes such as node 400 in FIG. 4.

The visible nodes 502 are those that receive information from the environment (i.e., input data). Each visible node in layer 502 takes an item in the input data and passes it to the hidden nodes in the next layer 504. When a node in the hidden layer 504 receives an input value x from a visible node in layer 502 it multiplies x by the weight assigned to that connection (edge) and adds it to a bias b. The result of these two operations is then fed into an activation function which produces the node's output 506.

In the present example, CNC 500 comprises a liquid state machine (LSM). Whereas as classic artificial neural networks are fully connected with each node in one layer is connected to every node in the next layer. In contrast, in LSMs such as CNC 500 the nodes are randomly connected. These connections are recurrent in nature, meaning the nodes are formed along a temporal sequence. As a result, inputs form a spatio-temporal pattern of activations across the network nodes.

Unlike classic artificial neural networks, CNC algorithms transiently represent information in the time domain, making the dynamical state the critical domain to understand. Although CNCs exhibit chaotic or near-chaotic dynamics, the dynamics are suitably structured for some machine learning applications.

Figure 6:
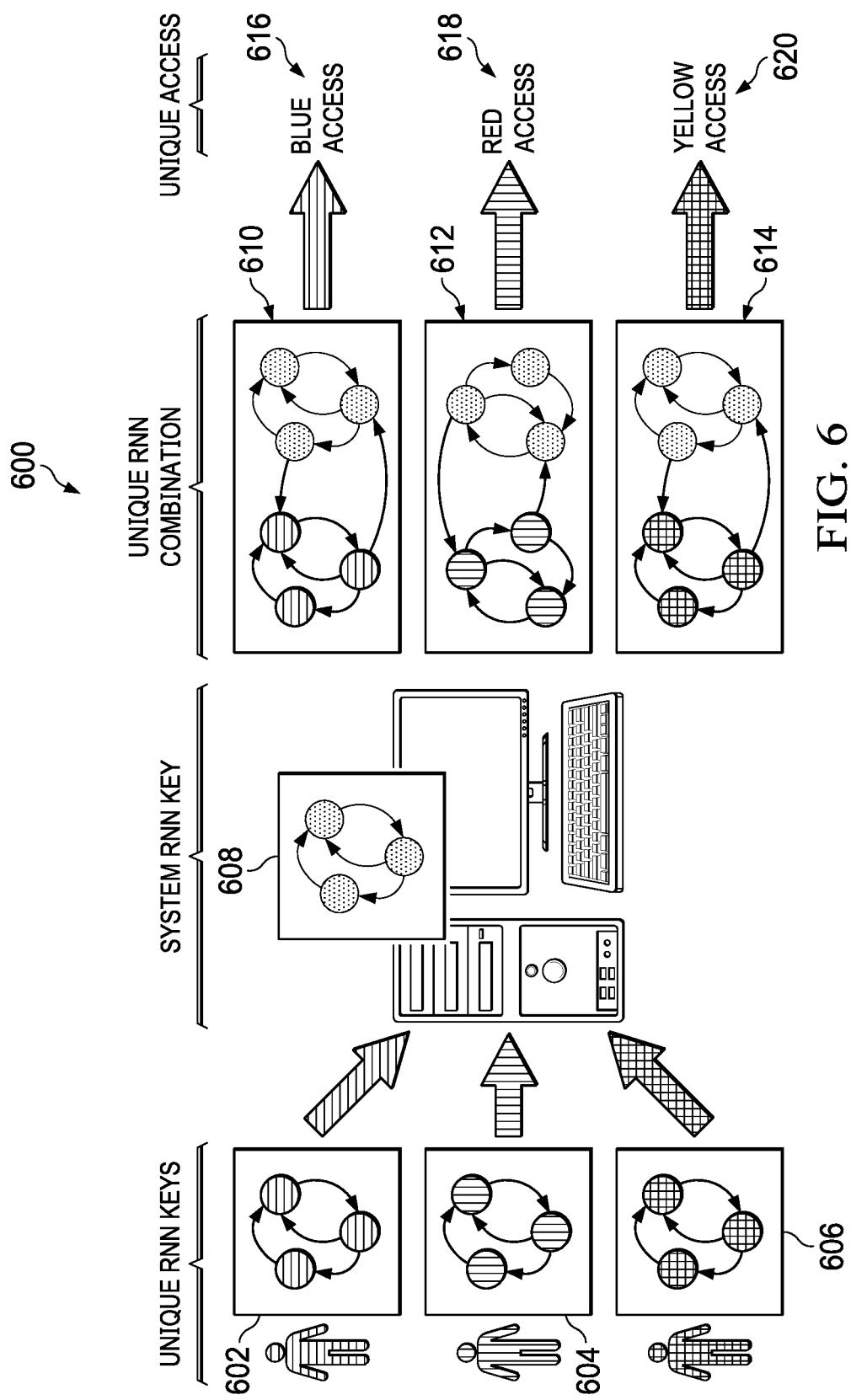
FIG. 6 depicts a diagram illustrating the operation of a user authentication system in accordance with an illustrative embodiment.

FIG. 6 depicts a diagram illustrating the operation of a user authentication system in accordance with an illustrative embodiment. Operation 600 might be an example operation of user authentication system 200 in FIG. 2.

A number of users each possess unique user RNNs 602, 604, 606 that generate respective unique user LSM keys. User RNNs 602, 604, 606 might be stored in a specific device such as, e.g., an identity card/badge or a thumb drive or similar mobile storage device that can interface with a client device, such as client devices 110 in FIG. 1. Alternatively, user RNNs 602, 604, 606 might incorporated directly inside a client device such as, e.g., client computer 112, mobile phone, 118, etc. The computer system being accessed by the users has its own system RNN 608, which generates a system LSM key.

User RNNs 602, 604, 606 and system RNN 608 might be instantiated as an application specific integrated circuit (ASIC), a conventional program running on a processor, or as custom neuromorphic hardware. In an embodiment, user RNNs 602, 604, 606 and system RNN 608 might comprise CNCs/LSMs.

When the users attempt to access the system, each of the user RNNs 602, 604, 606 is combined with system RNN 608, resulting in respective, unique combined RNNs 610, 612, 614. Each combined RNN 610, 612, 614 has computational characteristics that are not only different from each other but also different from the constituent user RNNs 602, 604, 606 and system RNN 608.

The system then provides a predetermined input to the respective combined RNNs 610, 612, 614 and observes their respective behaviors/outputs (keys), which are all different and unique despite the same predetermined input. Successful authentication of the respective outputs of the combination RNNs 610, 612, 614 provides unique access 616, 618, 620 to each respective combination of user and system keys. Authentication might be performed by comparing outputs of the combined RNNs with a database that stores the outputs of known (authorized) combined keys such as, e.g., access authorizations 216 in FIG. 2. Alternatively, the combined RNNs might output a public/private key pair. The public key is then stored in a database. During subsequent authentication, the private key, remeasured as the output of the combined key, and the public key in the database are used in a standard cryptographic authentication using Rivest-Shamir-Adleman (RSA) or elliptic curve cryptography. Similar authentication can be performed using symmetric cryptography such as Advanced Encryption Standard (AES).

The computational uniqueness of the combination keys 610, 612, 614 from the constituent keys provides significant security benefits. During authorization, the authenticator only has visibility into the combined RNN and the combined RNN output without the need to have full access to the user information. User RNNs/keys remain in the possession of the users, and the system key is never directly exposed. Observations of the dynamics/behavior of the combined keys yield minimal information about the constituent user and system keys. Therefore, if the system is compromised, the respective user keys are not compromised. For example, if the system is hacked by an adversary, only the combined keys would be lost, not the personal keys of the individual users. Conversely, if a user key is compromised, the system key and other user keys are not compromised, only the access for the specific user in question.

Authentication can be one-way or two-way, allowing the system or user to ascertain the appropriateness of the connection.

Figure 7A:
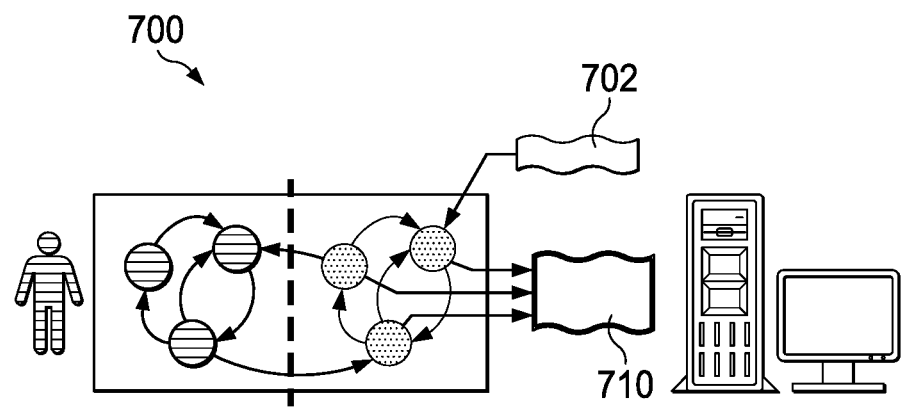
FIG. 7A depicts a diagram illustrating system side multi-factor authorization in a user authentication system in accordance with an illustrative embodiment.
Figure 7B:
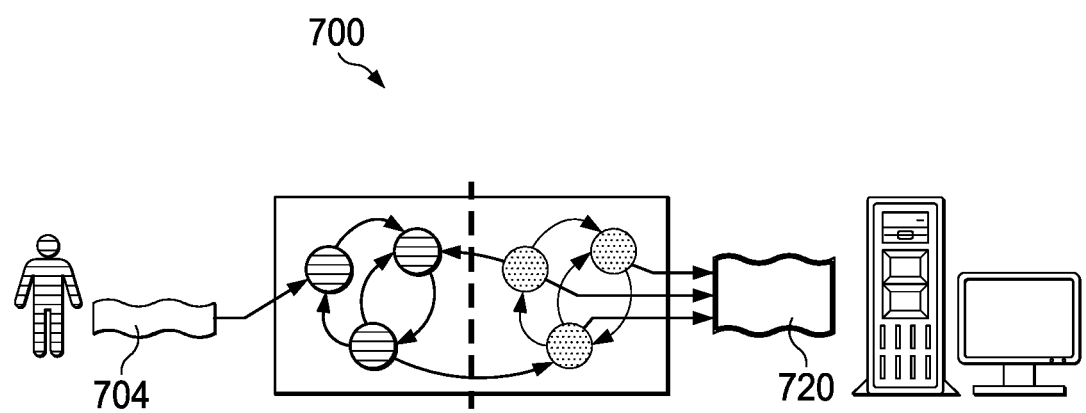
FIG. 7B depicts a diagram illustrating system side multi-factor authorization in a user authentication system in accordance with an illustrative embodiment.

FIGS. 7A and 7B depict diagrams illustrating multi-factor authorization in a user authentication system in accordance with an illustrative embodiment. Multi-factor authorization 700 provides additional security to the authentication operation shown in FIG. 6.

FIG. 7A depicts multi-factor authentication from the system side. After the initial authentication of a combined key allows a connection with the system, the system can then send a second predetermined input (system "password") 702 to the combined RNN to generate the multi-factor authentication 710.

FIG. 7B depicts multi-factor authentication from the user side. In this configuration, after the initial authentication of a combined key allows a connection with the system, the user provides the second predetermined input 702 to the combined RNN to generate the multi-factor authentication 712. This user-provided second input might comprise a convention password or a biometric input such as voice recognition.

Figure 8:
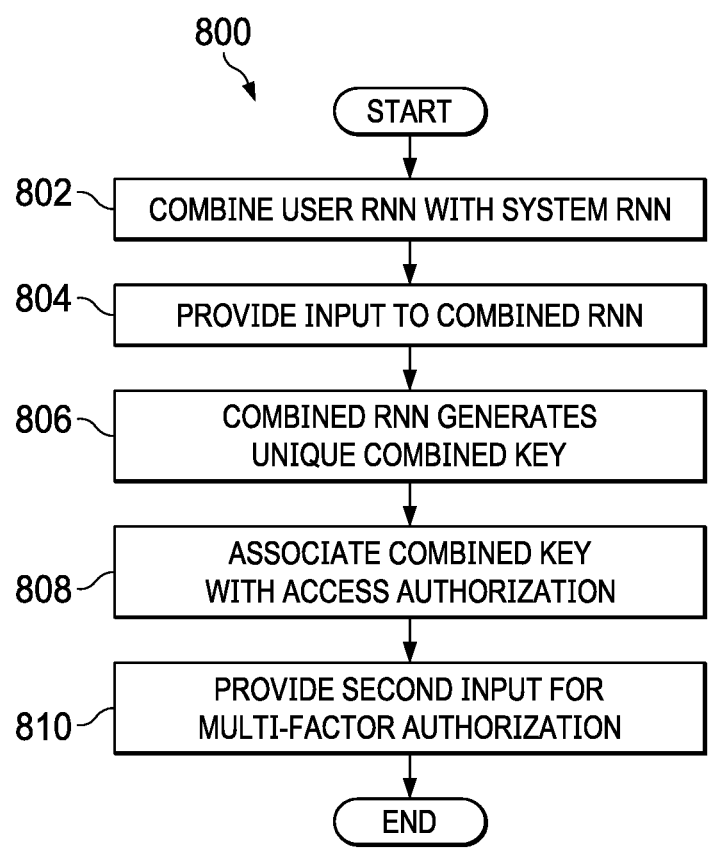
FIG. 8 depicts a flowchart illustrating a process for user authentication in accordance with illustrative embodiments.

FIG. 8 depicts a flowchart illustrating a process for user authentication in accordance with illustrative embodiments. Process 800 might be implemented in hardware, software, or both. When implemented in software, the process can take the form of program code that is run by one of more processor units located in one or more hardware devices in one or more computer systems. Process 800 might be implemented in user authentication system 200 shown in FIG. 2 using RNNs such as CNC 500 shown in FIG. 5.

Process 800 begins with a computer system combining a user RNN with a system RNN for the computer system to form a unique combined RNN that comprises a physically unclonable function (step 802). The user RNN is configured to generate a unique user key, and the system RNN is configured to generate a unique system key. The user and system RNNs might comprise liquid state machines and be implemented in custom neuromorphic hardware. The user RNN and system RNN combined produce encrypted output data as a function of input data and the structures of the RNNs.

The computer system inputs a predetermined input to the combined RNN (Step 804). The predetermined input provided to the combined key might comprise a pre-determined sequence of neuron spikes. The combined RNN generates a unique combined key (output) from the input, wherein the combined key differs from both the user key and system key (step 806).

The computer system associates the combined key with a unique access authorization (step 808). Optionally, a second predetermined input may also be provided to the system to the combined RNN for multi-factor authorization (step 810). The second input may be provided by a user associated with the user key and comprise a conventional password or voice recognition. Alternatively, the second input may be provided by the system.

After authentication, process 800 ends.

Figure 9:
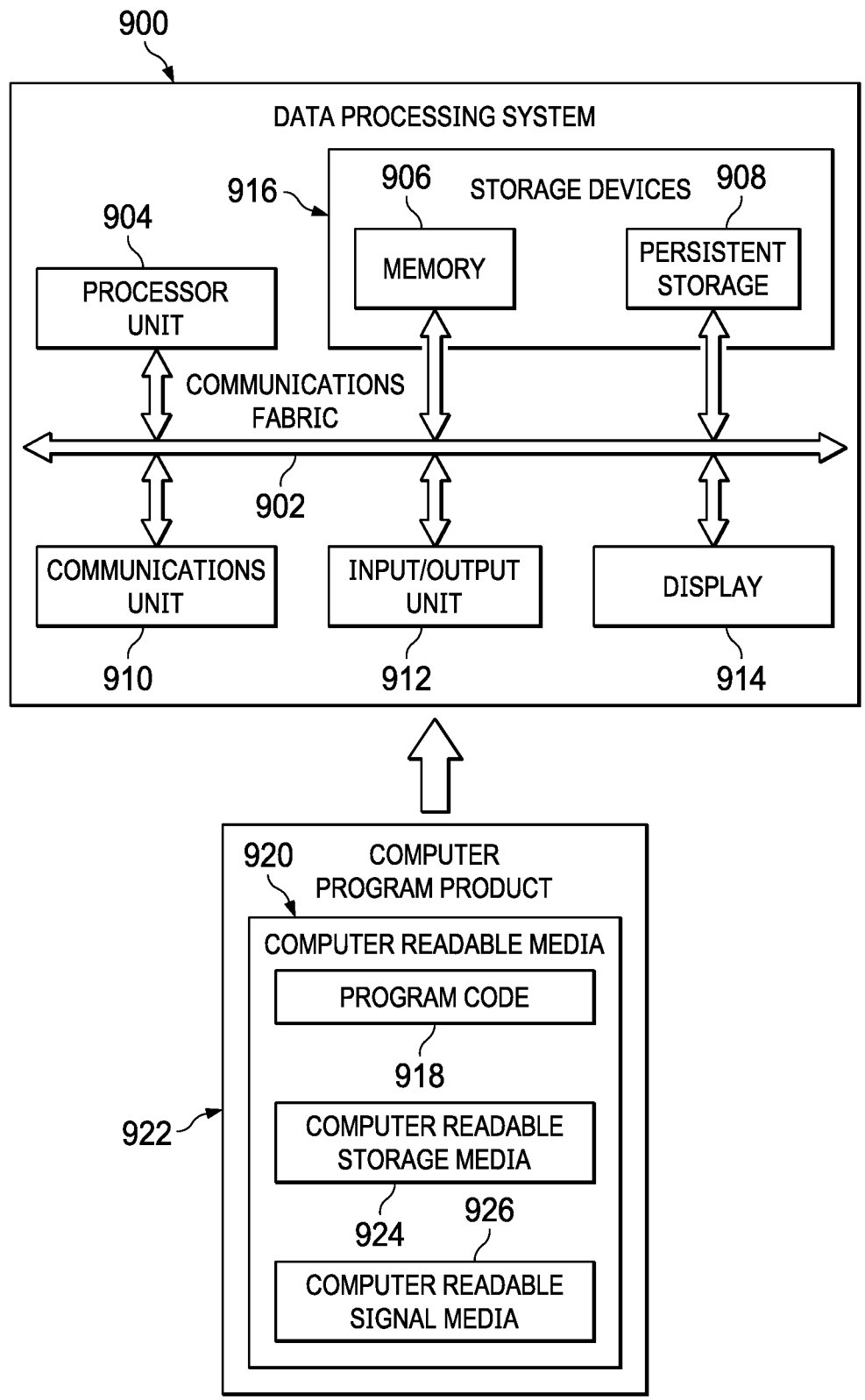
FIG. 9 is a diagram of a data processing system depicted in accordance with an illustrative embodiment.

Turning now to FIG. 9, an illustration of a block diagram of a data processing system is depicted in accordance with an illustrative embodiment. Data processing system 900 may be used to implement servers 104 and 106 and client devices 110 in FIG. 1, as well as user authentication system 200 in FIG. 2. In this illustrative example, data processing system 900 includes communications framework 902, which provides communications between processor unit 904, memory 906, persistent storage 908, communications unit 910, input/output unit 912, and display 914. In this example, communications framework 902 may take the form of a bus system.

Processor unit 904 serves to execute instructions for software that may be loaded into memory 906. Processor unit 904 may be a number of processors, a multi-processor core, or some other type of processor, depending on the particular implementation. In an embodiment, processor unit 904 comprises one or more conventional general-purpose central processing units (CPUs). In an alternate embodiment, processor unit 904 comprises one or more graphical processing units (GPUs).

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 916, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908. Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer-usable program code, or computer-readable program code that may be read and executed by a processor in processor unit 904. The program code in the different embodiments may be embodied on different physical or computer-readable storage media, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these illustrative examples. In one example, computer-readable media 920 may be computer-readable storage media 924 or computer-readable signal media 926.

In these illustrative examples, computer-readable storage media 924 is a physical or tangible storage device used to store program code 918 rather than a medium that propagates or transmits program code 918. Computer readable storage media 924, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 918 may be transferred to data processing system 900 using computer-readable signal media 926. Computer-readable signal media 926 may be, for example, a propagated data signal containing program code 918. For example, computer-readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of user authentication, the method comprising:
    using a number of processors to perform the steps of:
        combining, by a computer system, a user recurrent neural network with a system recurrent neural network to form a unique combined recurrent neural network, wherein the user recurrent neural network is configured to generate a unique user key and the system recurrent neural network is configured to generate a system key;
        inputting, by the computer system, a predetermined input into the combined recurrent neural network;
        generating, by the combined recurrent neural network, a unique combined key from the input, wherein the combined key differs from both the user key and system key; and
        associating, by the computer system, the combined key with a unique access authorization to authenticate a user.

2. The method of claim 1, further comprising inputting a second predetermined input to the combined recurrent neural network for multi-factor authorization.

3. The method of claim 2, wherein the second predetermined input is provided by the user.

4. The method of claim 3, wherein the second predetermined input comprises one of:
    a password;
    a passphrase;
    personal identification number;
    voice recognition;
    facial recognition;
    retinal scan;
    iris recognition;
    fingerprints;
    handprint; or
    palm vein pattern.

5. The method of claim 2, wherein the second predetermined input is provided by the computer system.

6. The method of claim 1, wherein the user recurrent neural network and system recurrent neural network comprise liquid state machines.

7. The method of claim 1, wherein the user recurrent neural network and system recurrent neural network comprise neuromorphic hardware.

8. The method of claim 1, wherein the predetermined input comprises a pre-determined sequence of neuron spikes.

9. The method of claim 1, wherein the combined recurrent neural network comprises a physically unclonable function.

10. The method of claim 1, wherein the user recurrent neural network and system recurrent neural network combined produce encrypted output data as a function of input data and the structures of the recurrent neural networks.

11. A computer-implemented method of user authentication, the method comprising:
    using a number of processors to perform the steps of:
        combining, by a computer system, each of a number of user recurrent neural network with a system recurrent neural network to form respective unique combined recurrent neural networks, wherein each user recurrent neural network generates a unique respective user key and the system recurrent neural network generates a system key;
        inputting, by the computer system, a same predetermined input into each combined recurrent neural network, wherein each combined neural circuit generates a unique combined key from the same input, and wherein each combined key differs from the system key and the user key of the user recurrent neural network comprising each combined recurrent neural network; and
        associating, by the computer system, each combined key with a unique access authorization to authenticate a user.

12. A user authentication system, comprising:
    a user recurrent neural network configured to generate a user key;
    a computer system comprising:

a system recurrent neural network configured to generate a system key; and a storage device configured to store program instructions and one or more processors operably connected to the storage device and configured to execute the program instructions to cause the computer system to:

combine the user recurrent neural network with the system recurrent neural network to form a unique combined recurrent neural network;

input a predetermined input into the combined recurrent neural network;

generate, with the combined recurrent neural network, a unique combined key from the input, wherein the combined key differs from both the user key and system key; and associate the combined key with a unique access authorization to authenticate a user.

13. The user authentication system of claim 12, further comprising inputting a second predetermined input to the combined recurrent neural network for multi-factor authorization.

14. The user authentication system of claim 13, wherein the second predetermined input is supplied by the user.

15. The user authentication system of claim 14, wherein the second predetermined input comprises one of:

a password;

a passphrase;

personal identification number;

voice recognition;

facial recognition;

retinal scan;

iris recognition;

fingerprints;

handprint; or palm vein pattern.

16. The user authentication system of claim 13, wherein the second predetermined input is provided by the computer system.

17. The user authentication system of claim 12, wherein the user recurrent neural network and system recurrent neural network comprise liquid state machines.

18. The user authentication system of claim 12, wherein the user recurrent neural network and system recurrent neural network comprise neuromorphic hardware.

19. The user authentication system of claim 12, wherein the predetermined input comprises a pre-determined sequence of neuron spikes.

20. The user authentication system of claim 12, wherein the combined recurrent neural network comprises a physically unclonable function.

21. The user authentication system of claim 12, wherein the user recurrent neural network and system recurrent neural network combined produce encrypted output data as a function of input data and the structures of the recurrent neural networks.

* * * * *